US010916236B2

(12) United States Patent
Kinoshita et al.

(10) Patent No.: US 10,916,236 B2
(45) Date of Patent: Feb. 9, 2021

(54) OUTPUT DEVICE, OUTPUT METHOD, AND ELECTRONIC APPARATUS

(71) Applicant: FUJITSU LIMITED, Kawasaki (JP)

(72) Inventors: Kaoru Kinoshita, Kita (JP); Masayoshi Shimizu, Hadano (JP); Shinji Kanda, Fujisawa (JP)

(73) Assignee: FUJITSU LIMITED, Kawasaki (JP)

(*) Notice: Subject to any disclaimer, the term of this patent is extended or adjusted under 35 U.S.C. 154(b) by 84 days.

(21) Appl. No.: 16/298,158

(22) Filed: Mar. 11, 2019

(65) Prior Publication Data

US 2019/0206387 A1 Jul. 4, 2019

Related U.S. Application Data

(63) Continuation of application No. PCT/JP2018/001082, filed on Jan. 17, 2018.

(30) Foreign Application Priority Data

Jan. 30, 2017 (JP) ................. 2017-014042

(51) Int. Cl.
*G10L 15/22* (2006.01)
*G10L 15/02* (2006.01)
*B25J 11/00* (2006.01)
*G06F 40/30* (2020.01)
*G06F 40/279* (2020.01)

(52) U.S. Cl.
CPC ............ *G10L 15/02* (2013.01); *B25J 11/00* (2013.01); *G06F 40/279* (2020.01); *G06F 40/30* (2020.01); *G10L 15/22* (2013.01)

(58) Field of Classification Search
CPC ......... G10L 13/08; G10L 13/10; G10L 15/22; A63H 13/00
See application file for complete search history.

(56) References Cited

U.S. PATENT DOCUMENTS

| | | | |
|---|---|---|---|
| 2001/0021907 A1* | 9/2001 | Shimakawa | ............ G10L 13/00 704/260 |
| 2002/0050802 A1 | 5/2002 | Inoue et al. | |
| 2004/0024602 A1* | 2/2004 | Kariya | .................. G10L 13/08 704/270 |

(Continued)

FOREIGN PATENT DOCUMENTS

| | | |
|---|---|---|
| JP | 2004-268235 A | 9/2004 |
| JP | 2007-50461 A | 3/2007 |

(Continued)

OTHER PUBLICATIONS

International Search Report dated Mar. 20, 2018, issued in counterpart International Application No. PCT/JP2018/001082 (2 pages).

*Primary Examiner* — Daniel Abebe
(74) *Attorney, Agent, or Firm* — Westerman, Hattori, Daniels & Adrian, LLP

(57) ABSTRACT

An output device includes a memory and a processor coupled to the memory. The processor obtains an utterance command and an action command, analyzes an utterance content of the utterance command inputted after an action performed in response to the action command, modifies the action command based on a result of the analysis, and outputs the modified action command and the utterance command.

7 Claims, 5 Drawing Sheets

(56) References Cited

U.S. PATENT DOCUMENTS

| | | | |
|---|---|---|---|
| 2006/0184273 | A1 | 8/2006 | Sawada et al. |
| 2012/0191460 | A1 | 7/2012 | Ng-Thow-Hing et al. |
| 2015/0206534 | A1 | 7/2015 | Shinkai |
| 2019/0294638 | A1* | 9/2019 | Sugiyama .......... G06F 16/90332 |
| 2020/0016745 | A1* | 1/2020 | Tang ........................ G10L 25/63 |
| 2020/0020333 | A1* | 1/2020 | Amores ............... B25J 11/0005 |

FOREIGN PATENT DOCUMENTS

| | | |
|---|---|---|
| JP | 2010-149276 A | 7/2010 |
| JP | 2010-188429 A | 9/2010 |
| JP | 2014-504959 A | 2/2014 |
| JP | 2015-138147 A | 7/2015 |
| JP | 2016-126294 A | 7/2016 |
| WO | 2012/103030 A1 | 8/2012 |

* cited by examiner

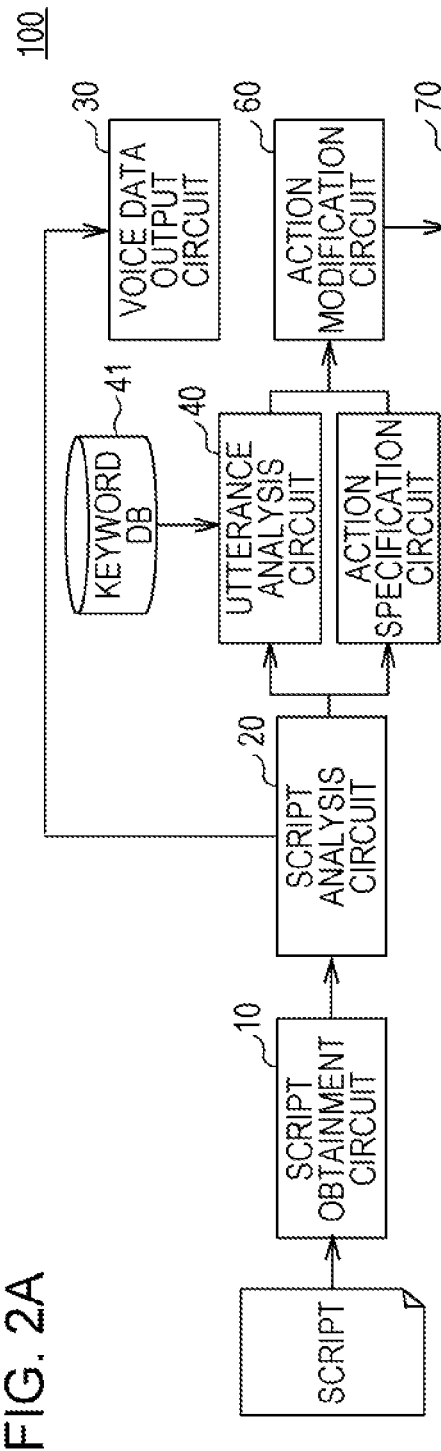
FIG. 2A
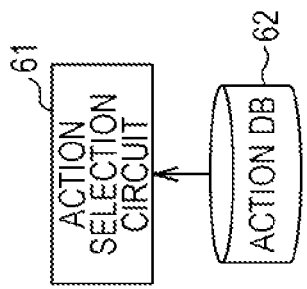
FIG. 2B
FIG. 2C

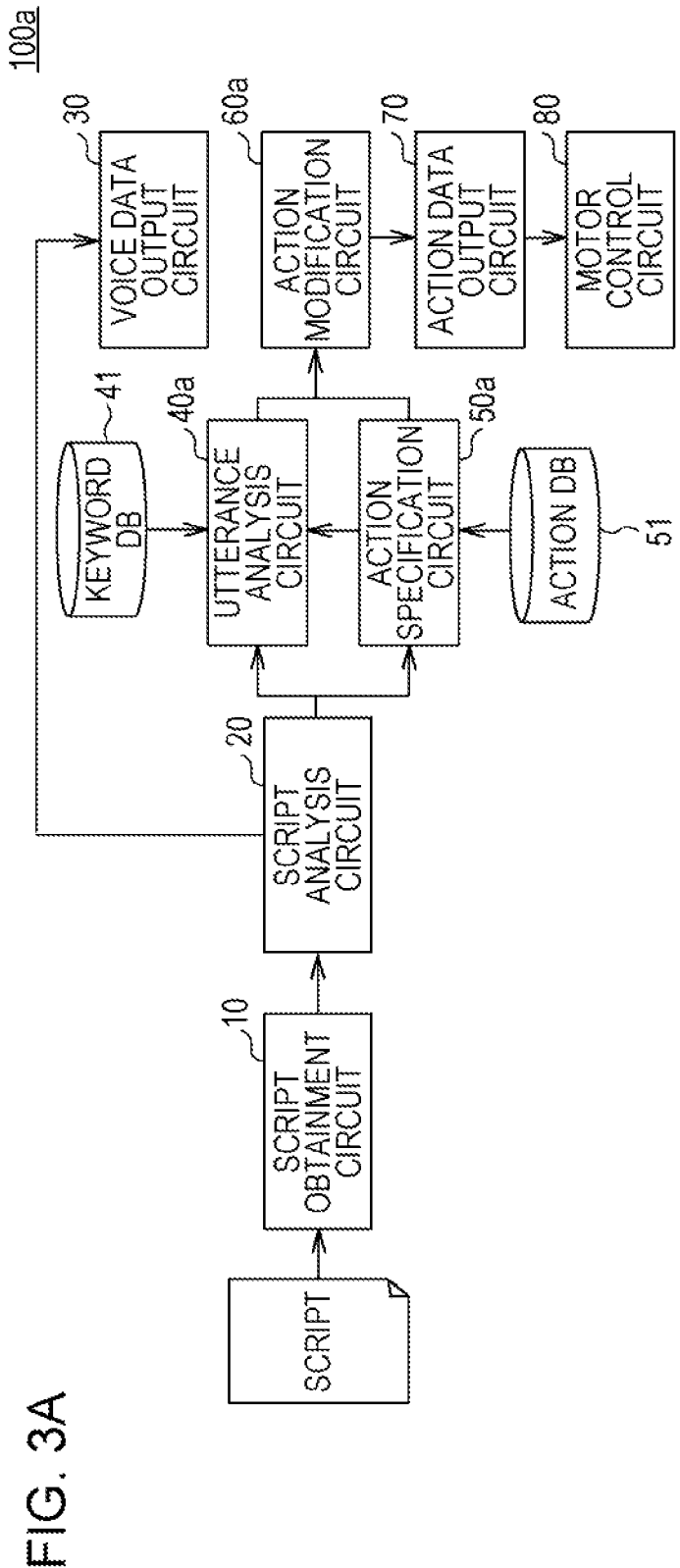
FIG. 3A
FIG. 3B
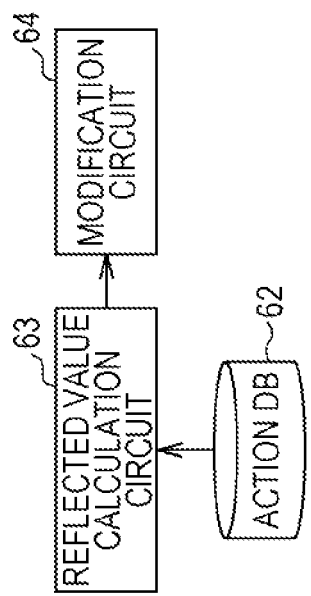
FIG. 3C
| | DISCOURAGED BASIC MOTION | DEGREE OF MODIFICATION REFLECTION | MODIFICATION VALUE | MODIFICATION OPERATION AMOUNT |
|---|---|---|---|---|
| JOINT 1 | 30 | 0 | 0 | 30 |
| JOINT 2 | 40 | 1 | 70 | 110 |
| JOINT 3 | 10 | 2 | 140 | 150 |
| JOINT 4 | 0 | -3 | -210 | -210 |
| ... | | | | |

| | DELIGHT | ANGER | SORROW | PLEASURE | ADJUSTMENT |
|---|---|---|---|---|---|
| FUN | 15 | | | 35 | |
| ... | | | | | |
| TIRED | | 15 | 35 | | |
| ... | | | | | |
| TOMORROW TOO | | | | | x1 |
| BUT | | | | | x-1 |

I AM TIRED TODAY
Action:
I EXPECT THAT TOMORROW WOULD BE A HARD DAY TOO param= {A (DELIGHT: 0, ANGER: 15, SORROW: 35, PLEASURE: 0), B (DELIGHT: 0, ANGER: 15, SORROW: 35, PLEASURE: 0)}

I AM TIRED TODAY, BUT
Action:
IT WAS FUN param= {A (DELIGHT: 0, ANGER: 15, SORROW: 35, PLEASURE: 0), B (DELIGHT: 16, ANGER: 0, SORROW: 0, PLEASURE: 36)}

| ACTION NAME | DELIGHT | ANGER | SORROW | PLEASURE | ANOTHER PARAMETER |
|---|---|---|---|---|---|
| A | 0 | 0 | 1 | 0 | 0 |
| B | 0 | 0 | 0 | 0 | 1 |
| C | 0 | 0.5 | 1 | 0 | 0 |
| ... | | | | | |

OUTPUT DEVICE, OUTPUT METHOD, AND ELECTRONIC APPARATUS

CROSS-REFERENCE TO RELATED APPLICATION

This application is a continuation application of International Application PCT/JP2018/001082 filed on Jan. 17, 2018 and designated the U.S., the entire contents of which are incorporated herein by reference. The International Application PCT/JP2018/001082 is based upon and claims the benefit of priority of the prior Japanese Patent Application No. 2017-014042, filed on Jan. 30, 2017, the entire contents of which are incorporated herein by reference.

FIELD

The embodiments discussed herein are related to an output device, an output method, and an electronic apparatus.

BACKGROUND

There have been developed robots that make expressions using both utterance and action in combination. For such robots, to avoid a stereotypical action being selected in response to the same phrase, a technology that uses random numbers for avoiding the exact same action has been disclosed (for example, see International Publication Pamphlet No. WO/2012/103030). There has also been disclosed a technology that allows an animal robot to act based on history of inputted information (for example, see Japanese Laid-open Patent Publication No. 2010-149276).

SUMMARY

According to an aspect of the embodiments, an output device includes a memory and a processor coupled to the memory. The processor obtains an utterance command and an action command, analyzes an utterance content of the utterance command inputted after an action performed in response to the action command, modifies the action command based on a result of the analysis, and outputs the modified action command and the utterance command.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 2A is a block diagram of functions implemented by, executing a device control program, FIG. 23 is a block diagram of an action modification circuit, and FIG. 2C is a diagram that exemplifies a table stored in an action database;

FIG. 3A is a diagram that exemplifies functions implemented in a device control circuit according to Embodiment 2, FIG. 3B is a block diagram of an action modification circuit, and FIG. 3C is a diagram that exemplifies calculated parameter-reflected values;

FIG. 43 is a diagram that exemplifies extraction of parameters of emotions.

DESCRIPTION OF EMBODIMENTS

However, the technology using the random numbers may not guarantee a natural action. For example, in a case of repeating an action of "discouraged", if a head is put down a little deeper in the first time and is put down less in the second time, they are not stereotypical but the actions would be unnatural. In addition, in a case of acting based on the history of inputted information, since behavior is determined based on, the accumulated past information, the action would be unnatural depending on an utterance following the behavior.

Hereinafter, embodiments are described with reference to the drawings.

Embodiment 1

Figure 1A:
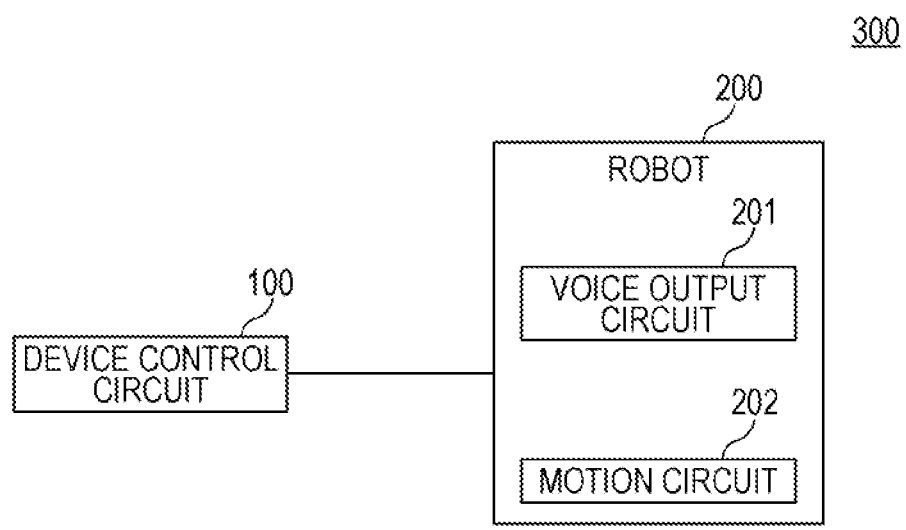
FIG. 1A is a block diagram for describing an electronic apparatus to which a device control circuit according to Embodiment 1 is applied.

FIG. 1A is a block diagram for describing an electronic apparatus 300 to which a device control circuit 100 according to Embodiment 1 is applied. As exemplified in FIG. 1A, the electronic apparatus 300 includes the device control circuit 100 and a robot 200. The robot 200 is a talking robot including a voice output circuit 201, a motion circuit 202, and the like. The voice output circuit 201 is a speaker or the like to make an utterance based on voice data transmitted from the device control circuit 100. The motion circuit 202 includes a motor and so on for driving joints of the robot 200 and performs actions by realizing joint angles according to motor control data transmitted from the device control circuit 100. The user of the electronic apparatus 300 is a developer who uses the robot 200 to develop a demonstration using both utterance and action in combination, for example.

Figure 1B:
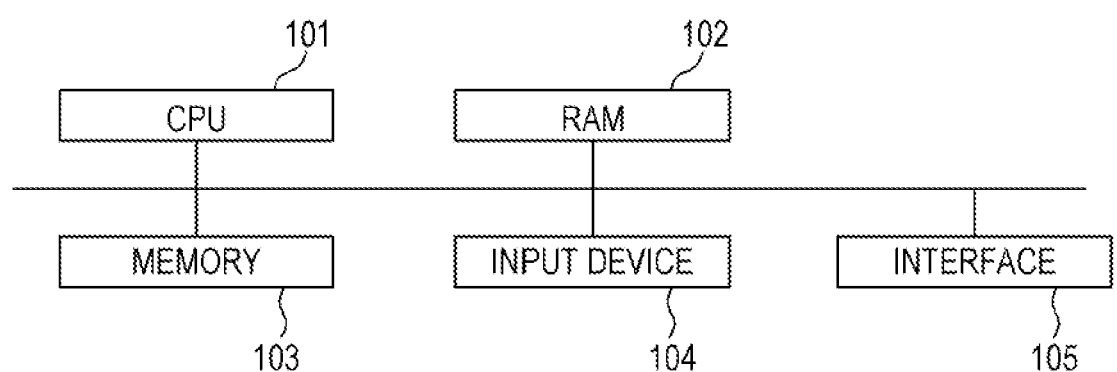
FIG. 1B is a diagram that exemplifies a hardware configuration of the device control circuit.

FIG. 1B is a diagram that exemplifies a hardware configuration of the device control circuit 100. As exemplified in FIG. 1B, the device control circuit 100 includes a CPU 101, a RAM 102, a memory 103, an input device 104, an interface 105, and so on. These units are coupled via a bus or the like.

The central processing unit (CPU) 101 is a processor. The CPU 101 includes one or more cores. The random access memory (RAM) 102 is a volatile memory that temporally stores a program executed by the CPU 101, data processed by the CPU 101, and the like. The memory 103 is a non-volatile storage. A read only memory (ROM), a solid state drive (SSD) such as a flash memory, a hard disk driven by a hard disk drive, and so on may be used as the memory 103, for example. The input device 104 is a keyboard, a mouse, and so on that are devices allowing the user to input information. The interface 105 is an interface for transmitting and receiving signals to and from the robot 200.

Once the CPU 101 executes a device control program stored in the memory 103, functions are implemented in the device control circuit 100. FIG. 2A is a block diagram of the functions implemented by executing the device control program. Each function may be hardware of a dedicated circuit or the like.

As exemplified in FIG. 2A, a script obtainment circuit 10, a script analysis circuit 20, a voice data output circuit 30, an utterance analysis circuit 40, an action specification circuit 50, an action modification circuit 60, an action data output circuit 70, a motor control circuit 80, and the like are implemented in the device control circuit 100. As exemplified in FIG. 2B, the action modification circuit 60 includes an action selection circuit 61 and an action database 62.

The script obtainment circuit 10 obtains a script inputted from the input device 104 by the user, for example. The script includes an utterance command and an action command. For example, the utterance command includes a first utterance content and a second utterance content. In this embodiment, "I am tired today" is inputted as the first utterance content, and "I expect that tomorrow will be a hard day too" is inputted as the second utterance content following the first utterance content. In addition, in this embodiment, "discouraged" is inputted as the action command for an action between the first utterance content and the second utterance content. The script obtainment circuit 10 transmits the obtained script to the script analysis circuit 20.

The script analysis circuit 20 analyzes the script received from the script obtainment circuit 10. In this embodiment, the script analysis circuit 20 extracts the first and second utterance contents from the script received from the script obtainment circuit 10 and transmits them to the voice data output circuit 30. The voice data output circuit 30 transmits voice data of the first and second utterance contents to the voice output circuit 201 in FIG. 1A. As a result, the robot 200 speaks "I am tired today" and then speaks "I expect that tomorrow will be a hard day too" from the voice output circuit 201.

The script analysis circuit 20 transmits the first and second utterance contents to the utterance analysis circuit 40. In addition, the script analysis circuit 20 extracts the action command from the script received from the script obtainment circuit 10 and transmits it to the action specification circuit 50. The utterance analysis circuit 40 analyzes the first and second utterance contents. For example, the utterance analysis circuit 40 refers to a keyword database 41 and extracts a first keyword from the first utterance content. For example, "tired" is extracted as the first keyword. The utterance analysis circuit 40 transmits an index A, which is the first keyword or information indicating that no keyword is in the first utterance content, to the action modification circuit 60. The utterance analysis circuit 40 then refers to the keyword database 41 and extracts a second keyword from the second utterance content. For example, "tomorrow too" is extracted as the second keyword. The utterance analysis circuit 40 transmits an index B, which is the second keyword or information indicating that no keyword is in the second utterance content, to the action modification circuit 60. The indexes A and B have a function of a modification resource.

The action specification circuit 50 refers to an action database 51 and specifies a basic motion of the action command "discouraged" received from the script analysis circuit 20. For example, the action specification circuit 50 specifies a motion of putting head down as the basic motion of the action command "discouraged". In addition, the action specification circuit 50 specifies an action modification resource for the motion of putting head down. For example, angles of a neck, hands, arms, and the like are specified as the modification resource. The action specification circuit 50 transmits the specified action command and the action modification resource to the action modification circuit 60.

As exemplified in FIG. 2C, the action database 62 stores modification examples as details of the modification, which correspond to the indexes A and B, for each of multiple actions. For example, when the action command is "discouraged", the angles of the neck, hands, arms, and the like corresponding to the indexes A and B are stored as the modification examples. For example, when the index A includes "tired" and the index B includes "tomorrow too", the motion of putting head down (angle of joint) may be larger. The action selection circuit 61 selects the action examples corresponding to the indexes A and B from the action database 62 and modifies the basic motion of the action command "discouraged". The action selection circuit 61 transmits the modified motion to the action data output circuit 70.

The action data output circuit 70 transmits data on the modified motion to the motor control circuit 80. The motor control circuit 80 allows the robot 200 to perform the action by controlling the motor included in the motion circuit 202 in FIG. 1A based on the received data. As a result, in the robot 200, the voice output circuit 201 speaks "I am tired today", the motion circuit 202 then performs the modified "discouraged" motion, and thereafter the voice output circuit 201 speaks "I expect that tomorrow will be a hard day too".

According to this embodiment, the action command is modified according to the utterance content following the action based on the action command. The motion circuit 202 of the robot 200 performs the action in response to the modified action command. If only the utterance content before the action is analyzed, the action would be unnatural depending on the utterance content following the action. On the other hand, in this embodiment, the result of the analysis of the utterance content following the action is reflected in the modification of the action command; thus, an action proper for the utterance content is performed. In addition, the action may be modified to a more proper action by modifying the action command based on both the utterance contents before and following the action. In this embodiment, the voice data output circuit 30 transmits the voice data to the voice output circuit 201 to allow the robot 200 to speak, and the action data output circuit 70 transmits the data on the modified motion to the motor control circuit 80 to allow the robot 200 to perform the action; however, it is not limited thereto. For example, the voice data outputted from the voice data output circuit 30 and the data on the motion outputted by the action data output circuit 70 may be stored in a storage such as a memory.

In this embodiment, the script obtainment circuit 10 functions as an example of an obtainment circuit that obtains the utterance command and the action command. The utterance analysis circuit 40 functions as an example of an analysis circuit that analyzes the utterance content following the action based on the action command in the utterance command. The action modification circuit 60 functions as an example of a modification circuit that modifies the action command based on the result of the analysis of the analysis circuit. The voice data output circuit 30 and the action data output circuit 70 function as examples of output circuits that respectively output the action command modified by the modification circuit and the utterance command. The voice output circuit 201 functions as an example of an utterance circuit that makes an utterance in response to the utterance command. The motion circuit 202 functions as an example of a motion circuit that performs action in response to the action command.

Embodiment 2

FIG. 3A is a diagram that exemplifies functions implemented in a device control circuit 100*a* according to Embodiment 2. The device control circuit 100a differs from the device control circuit 100 according to Embodiment 1 in that an utterance analysis circuit 40a is implemented instead of the utterance analysis circuit 40, an action specification circuit 50a is implemented instead of the action specification circuit 50, and an action modification circuit 60a is implemented instead of the action modification circuit 60. As exemplified in FIG. 3B, the action modification circuit 60a includes the action database 62, a reflected value calculation circuit 63, and a modification circuit 64. The case in which "I am tired today" is inputted as the first utterance content, "I expect that tomorrow will be a hard day too" is inputted as the second utterance content, and "discouraged" is inputted as the action is described in this embodiment as well. Descriptions of similar functions as those in Embodiment 1 are omitted by denoting the same reference numerals.

The utterance analysis circuit 40a refers to the keyword database 41 and extracts the first keyword from the first utterance content. For example, "tired" is extracted as the first keyword. The utterance analysis circuit 40a then refers to the keyword database 41 and extracts the second keyword from the second utterance content. For example, "tomorrow too" is extracted as the second keyword.

The action specification circuit 50a refers to the action database 51 to specify an emotion associated with the action command "discouraged" received from the script analysis circuit 20, and transmits it to the utterance analysis circuit 40a. For example, "discouraged" is associated with "sorrow" out of delight, anger, sorrow, and pleasure. The utterance analysis circuit 40a calculates a modification amount as a parameter based on the first and second keywords and the emotion "sorrow" associated with the action command "discouraged".

Figures 4A, 4B:
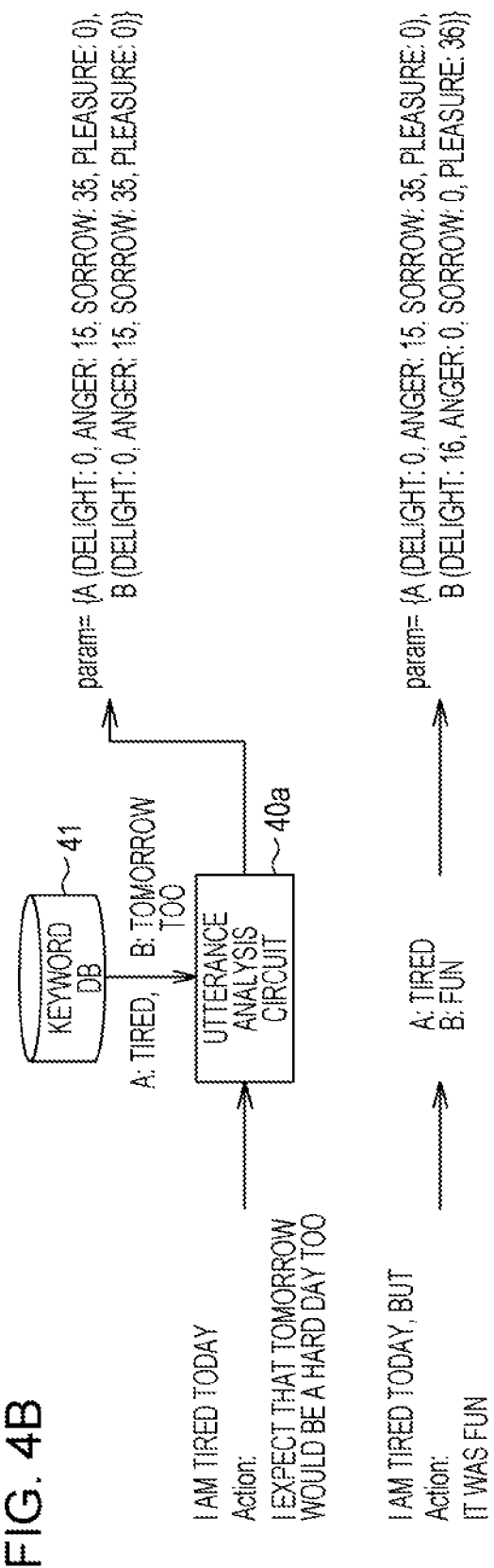
FIG. 4A is a diagram that exemplifies a table stored in a keyword database.

FIG. 4A is a diagram that exemplifies a table stored in the keyword database 41. As exemplified in FIG. 4A, the parameters of one or more emotions such as the delight, anger, sorrow, and pleasure are associated with the keywords in the table. For example, "fun" is associated with a parameter value "15" of "delight" and a parameter value "35" of "pleasure". For example, "tired" is associated with a parameter value "15" of "anger" and a parameter value "35" of "sorrow". For example, "tomorrow too" is associated with a coefficient "×1" as a parameter for emphasizing the emotion. For example, "but" is associated with a coefficient "×−1" as a parameter for weakening the emotion.

As exemplified in FIG. 4B, the utterance analysis, circuit 40a extracts the parameter value "15" of "anger" and the parameter value "35" of "sorrow" for "tired". The utterance analysis circuit 40a also extracts the coefficient "×1" for "tomorrow too", and multiplies each parameter value by the coefficient "×1" to extract the parameter value "15" of "anger" and the parameter value "35" of "sorrow". The utterance analysis circuit 40a extracts the parameter values "35" and "35" of the emotion "sorrow" received from the action specification circuit 50a and sums them together. The utterance analysis circuit 40a obtains the derived numerical value "70" as the modification amount.

For another example, when "I am tired today, but" is inputted as the first utterance content and "it was fun" is inputted as the second utterance content, "tired" is extracted as the first keyword and "fun" is extracted as the second keyword. In this case, the parameter value "15" of "anger" and the parameter value "35" of "sorrow" for "tired" are extracted, and the parameter value "15" of "delight" and the parameter value "35" of "pleasure" for "fun" are extracted. Since Japanese has a tendency that a later word meaning is more emphatic, a natural action proper for the utterance content may be realized by weighting the parameter values of the second keyword. For example, weighting may be performed by adding "1" to the parameter values of the second keyword. In this case, a parameter value "16" of "delight" and a parameter value "36" of "pleasure" for "fun" are extracted. In this case, if the action specification circuit 50a specifies the emotion "pleasure", a parameter value "0" and the parameter value "36" of "pleasure" are summed together, and the derived numerical value "36" is extracted as the modification amount. Since English has a tendency that a former word meaning is more emphatic, a weight of the parameter values of the first keyword may be greater. Like this, the target of weighting may be changed depending on language.

In the example of FIG. 4B, a single keyword is extracted from each of the first utterance content and the second utterance content; however, it is not limited thereto. For example, when multiple keywords are included in the first utterance content, parameter values of the respective keywords may be extracted and the corresponding parameters may be summed together.

The action specification circuit 50a refers to the action database 51 and specifies the basic motion of the action command "discouraged" received from the script analysis circuit 20. For example, the action specification circuit 50a specifies the joint angles of the neck, hands, arms, and the like for realizing the basic motion of "discouraged". Then, the action specification circuit 50a refers to the action database 51 and obtains a degree of modification reflection of the joints for the action command "discouraged". The action specification circuit 50a transmits the specified basic motion and the degree of modification reflection to the action modification circuit 60a. The degree of modification reflection has a function of the modification resource.

The reflected value calculation circuit 63 calculates a parameter-reflected value based on the basic motion and the degree of modification reflection received from the action specification circuit 50a and the modification value received from the utterance analysis circuit 40a. FIG. 3C is a diagram that exemplifies the calculated parameter-reflected values. Since the degree of modification reflection for a joint 1 is "0", an operation amount is not modified regardless of the modification amount. Since the degree of modification reflection for a joint 2 is "1", a modification amount 70 is multiplied by "1" and the derived modification amount "70" is added to an operation amount "40", and a modification operation amount "110" is calculated. Since the degree of modification reflection for a joint 3 is "2", the modification amount 70 is multiplied by "2" and the derived modification amount "140" is added to an operation amount "10", and a modification operation amount "150" is calculated. Since the degree of modification reflection for a joint 4 is "−3", the modification amount 70 is multiplied by "−3" and the derived modification amount "−210" is added to the operation amount "0", and a modification operation amount "−210" is calculated. The modification circuit 64 transmits the modified motion to the action data output circuit 70.

According to this embodiment, the action command is modified according to the utterance content following the action based on the action command. The motion circuit 202 of the robot 200 performs the action in response to the modified action command. If only the utterance content before the action is analyzed, the action would be unnatural depending on the utterance content following the action. On the other hand, in this embodiment, the result of the analysis of the utterance content following the action is reflected in the modification of the action command; thus, an action proper for the utterance content is performed. In addition, the action may be modified to a more proper action by modifying the action command according to both the utterance contents before and following the action. Also, since the parameters associated with the emotions are used for the modification amount of the basic motion, the action may be modified according to the emotions. Moreover, weighting of the emotion parameters allows for modification that fits the unique emotional expression of language. In this embodiment, the voice data output circuit 30 transmits the voice data to the voice output circuit 201 to allow the robot 200 to speak, and the action data output circuit 70 transmits the data on the modified motion to the motor control circuit 80 to allow the robot 200 to perform the action; however, it is not limited thereto. For example, the voice data outputted from the voice data output circuit 30 and the data on the motion outputted by the action data output circuit 70 may be stored in a storage such as a memory.

In the above examples, the script obtainment circuit 10 functions as an example of an obtainment circuit that obtains the utterance command and the action command. The utterance analysis circuit 40a functions as an example of an analysis circuit that analyzes the utterance content following the action based on the action command in the utterance command. The action modification circuit 60a functions as an example of a modification circuit that modifies the action command based on the result of the analysis of the analysis circuit. The voice data output circuit 30 and the action data output circuit 70 function as examples of output circuits that respectively output the action command modified by the modification circuit and the utterance command. The voice output circuit 201 functions as an example of an utterance circuit that makes an utterance in response to the utterance command. The motion circuit 202 functions as an example of a motion circuit that performs action in response to the action command.

Embodiment 3

Figures 5A, 5B:
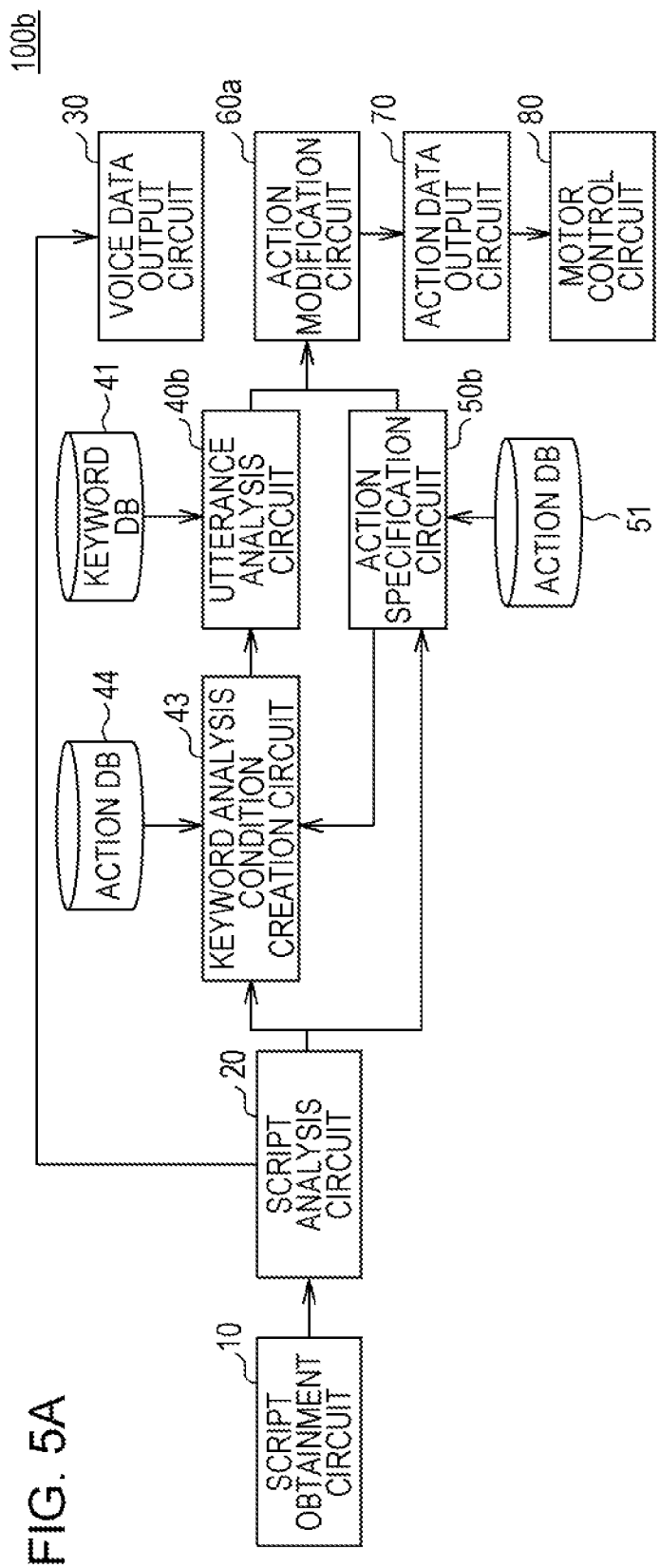
FIG. 5A is a diagram that exemplifies functions implemented in a device control circuit according to Embodiment 3.
FIG. 5B is a diagram that exemplifies a table stored in an action database.

FIG. 5A is a diagram that exemplifies functions implemented in a device control circuit 100b according to Embodiment 3. The device control circuit 100b differs from the device control circuit 100a according to Embodiment 2 in that an utterance analysis circuit 40b is provided instead of the utterance analysis circuit 40a, an action specification circuit 50b is provided instead of the action specification circuit 50a, and a keyword analysis condition creation circuit 43 and an action database 44 are additionally provided. The case in which "I am tired today" is inputted as the first utterance content, "I expect that tomorrow will be a hard day too" is inputted as the second utterance content, and "discouraged" is inputted as the action is described in this embodiment as well. Descriptions of similar functions as those in Embodiment 2 are omitted by denoting the same reference numerals.

The action specification circuit 50b refers to an action database 51 and specifies the basic motion of the action command "discouraged" received from the script analysis circuit 20. For example, the action specification circuit 50b specifies the joint angles of the neck, hands, arms, and the like for realizing the basic motion of the action command "discouraged". In addition, the action specification circuit 50b refers to the action database 51 and obtains the degree of modification reflection of the joints for the action command "discouraged". The action specification circuit 50b then transmits the specified basic motion and the degree of modification reflection to the action modification circuit 60a. The action specification circuit 50b also transmits the specified action command to the keyword analysis condition creation circuit 43.

FIG. 5B is a diagram that exemplifies a table stored in the action database 44. As exemplified in FIG. 5B, the table stores a degree of association of the delight, anger, sorrow, and pleasure with the action commands. As the numerical value is greater, the degree of association with each of the delight, anger, sorrow, and pleasure is higher. Note that the table may store another parameter associated with the action command, which is special information for a case of giving priority to a condition other than the basic parameters such as the delight, anger, sorrow, and pleasure. The keyword analysis condition creation circuit 43 refers to the action database 44 and obtains a combination of the degree of association of the delight, anger, sorrow, and pleasure or the special information associated with the action commands received from the action specification circuit 50b. The keyword analysis condition creation circuit 43 transmits the combination of the degree of association of the delight, anger, sorrow, and pleasure or the special information to the utterance analysis circuit 40b.

The utterance analysis circuit 40b refers to the keyword database 41 and extracts the first keyword from the first utterance content. For example, "tired" is extracted as the first keyword. The utterance analysis circuit 40b then refers to the keyword database 41 and extracts the second keyword from the second utterance content. For example, "tomorrow too" is extracted as the second keyword.

The utterance analysis circuit 40b extracts a parameter for any of the combinations of the delight, anger, sorrow, and pleasure received from the keyword analysis condition creation circuit 43 that has the degree of association equal to or greater than a threshold. For example, for the action command "discouraged", the degree of association of "sorrow" is set to be equal to or greater than the threshold. In the example described with reference to FIG. 4A, the utterance analysis circuit 40b extracts the parameter value "35" of "sorrow" for "tired". The utterance analysis circuit 40b then multiplies the parameter value by the coefficient "×1" and extracts the parameter value "35" of "sorrow" for "tomorrow too". The utterance analysis circuit 40b extracts these parameter values "35" and "35" of "sorrow" and sums them together. The utterance analysis circuit 40b obtains the derived numerical value "70" as the modification amount.

According to this embodiment, the action command is modified according to the utterance content following the action based on the action command. The motion circuit 202 of the robot 200 performs the action in response to the modified action command. If only the utterance content before the action is analyzed, the action would be unnatural depending on the utterance content following the action. On the other hand, in this embodiment, the result of the analysis of the utterance content following the action is reflected in the modification of the action command; thus, an action proper for the utterance content is performed. In addition, the action may be modified to a more proper action by modifying the action command according to both the utterance contents before and following the action. Also, since the parameters associated with the emotions are used for the modification amount of the basic motion, the action may be modified according to the emotions. Moreover, weighting of the emotion parameters allows for modification that fits the unique emotional expression of language. In this embodiment, the voice data output circuit 30 transmits the voice data to the voice output circuit 201 to allow the robot 200 to speak, and the action data output circuit 70 transmits the data on the modified motion to the motor control circuit 80 to allow the robot 200 to perform the action; however, it is not limited thereto. For example, the voice data outputted from the voice data output circuit 30 and the data on the motion outputted by the action data output circuit 70 may be stored in a storage such as a memory.

In the above examples, the script obtainment circuit 10 functions as an example of an obtainment circuit that obtains the utterance command and the action command. The utterance analysis circuit 40*b* functions as an example of an analysis circuit that analyzes the utterance content following the action based on the action command in the utterance command. The action modification circuit 60*a* functions as an example of a modification circuit that modifies the action command based on the result of the analysis of the analysis circuit. The voice data output circuit 30 and the action data output circuit 70 function as examples of output circuits that respectively output the action command modified by the modification circuit and the utterance command. The voice output circuit 201 functions as an example of an utterance circuit that makes an utterance in response to the utterance command. The motion circuit 202 functions as an example of a motion circuit that performs action in response to the action command.

The embodiments of the present disclosure are described in detail as the above; however, the present disclosure is not limited to the specific embodiment and may be modified or changed in various ways within a range of the gist of the present disclosure stated in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An output device comprising:
   a memory; and
   a processor coupled to the memory and configured to:
   obtain an utterance command and an action command, the utterance command including a first utterance content and a second utterance content, and the action command being located between the first utterance content and the second utterance content;
   analyze the utterance command by at least one of:
   extracting a keyword from each of the first utterance content and the second utterance content, and identifying a modification example based on the extracted keywords;
   extracting the keyword from each of the first utterance content and the second utterance content, identifying a parameter value associated with the action command, and calculating a modification amount based on the extracted keywords and the parameter value; and
   extracting the keyword from each of the first utterance content and the second utterance content, identifying a degree of association between the action command and an emotion, and calculating a modification amount based on the extracted keywords and the degree of association being greater than a threshold;
   modify the action command based on at least one of the modification example and the modification amount; and
   output the modified action command and the utterance command.

2. The output device according to claim 1, wherein the processor is configured to:
   store a plurality of modification examples for the action command; and
   select the modification example, corresponding to the keyword of the first utterance content and the keyword of the second utterance content, out of the plurality of modification examples.

3. The output device according to claim 1, wherein the processor is configured to calculate the modification amount by including weighting.

4. The output device according to claim 1, wherein the extracted keywords are stored in advance.

5. An electronic apparatus comprising:
   a speaker configured to make an utterance in response to an utterance command, the utterance command including a first utterance content and a second utterance content;
   a body configured to perform an action in response to an action command, the action command being located between the first utterance content and the second utterance content; and
   an output device including:
   a memory; and
   a processor coupled to the memory and configured to:
   analyze the utterance command by at least one of:
   extracting a keyword from each of the first utterance content and the second utterance content, and identifying a modification example based on the extracted keywords;
   extracting the keyword from each of the first utterance content and the second utterance content, identifying a parameter value associated with the action command, and calculating a modification amount based on the extracted keywords and the parameter value; and
   extracting the keyword from each of the first utterance content and the second utterance content, identifying a degree of association between the action command and an emotion, and calculating a modification amount based on the extracted keywords and the degree of association being greater than a threshold;
   modify the action command based on at least one of the modification example and the modification amount; and
   control the action of the body based on result of the modification.

6. An output method executed by a processor included in an output device, the method comprising:
   obtaining an utterance command and an action command, the utterance command including a first utterance content and a second utterance content, and the action command being located between the first utterance content and the second utterance content;
   analyzing the utterance command by at least one of:

extracting a keyword from each of the first utterance content and the second utterance content, and identifying a modification example based on the extracted keywords;

extracting the keyword from each of the first utterance content and the second utterance content, identifying a parameter value associated with the action command, and calculating a modification amount based on the extracted keywords and the parameter value; and extracting the keyword from each of the first utterance content and the second utterance content, identifying a degree of association between the action command and an emotion, and calculating a modification amount based on the extracted keywords and the degree of association being greater than a threshold;

modifying the action command based on at least one of the modification example and the modification amount; and outputting the modified action command and the utterance command.

7. A non-transitory computer-readable recording medium storing a program that causes a processor included in an output device to execute a process, the process comprising:

obtaining an utterance command and an action command, the utterance command including a first utterance content and a second utterance content, and the action command being located between the first utterance content and the second utterance content;

analyzing the utterance command by at least one of:

extracting a keyword from each of the first utterance content and the second utterance content, and identifying a modification example based on the extracted keywords;

extracting the keyword from each of the first utterance content and the second utterance content, identifying a parameter value associated with the action command, and calculating a modification amount based on the extracted keywords and the parameter value; and extracting the keyword from each of the first utterance content and the second utterance content, identifying a degree of association between the action command and an emotion, and calculating a modification amount based on the extracted keywords and the degree of association being greater than a threshold;

modifying the action command based on at least one of the modification example and the modification amount; and outputting the modified action command and the utterance command.

\* \* \* \* \*